March 29, 1949.   N. LESTER ET AL   2,465,889
INJECTION MOLDING APPARATUS
Filed April 16, 1945   3 Sheets-Sheet 1

INVENTORS
NATHAN LESTER and
WILLIAM H. SCHWARTZ
BY
Oberlin & Limbach
ATTORNEYS

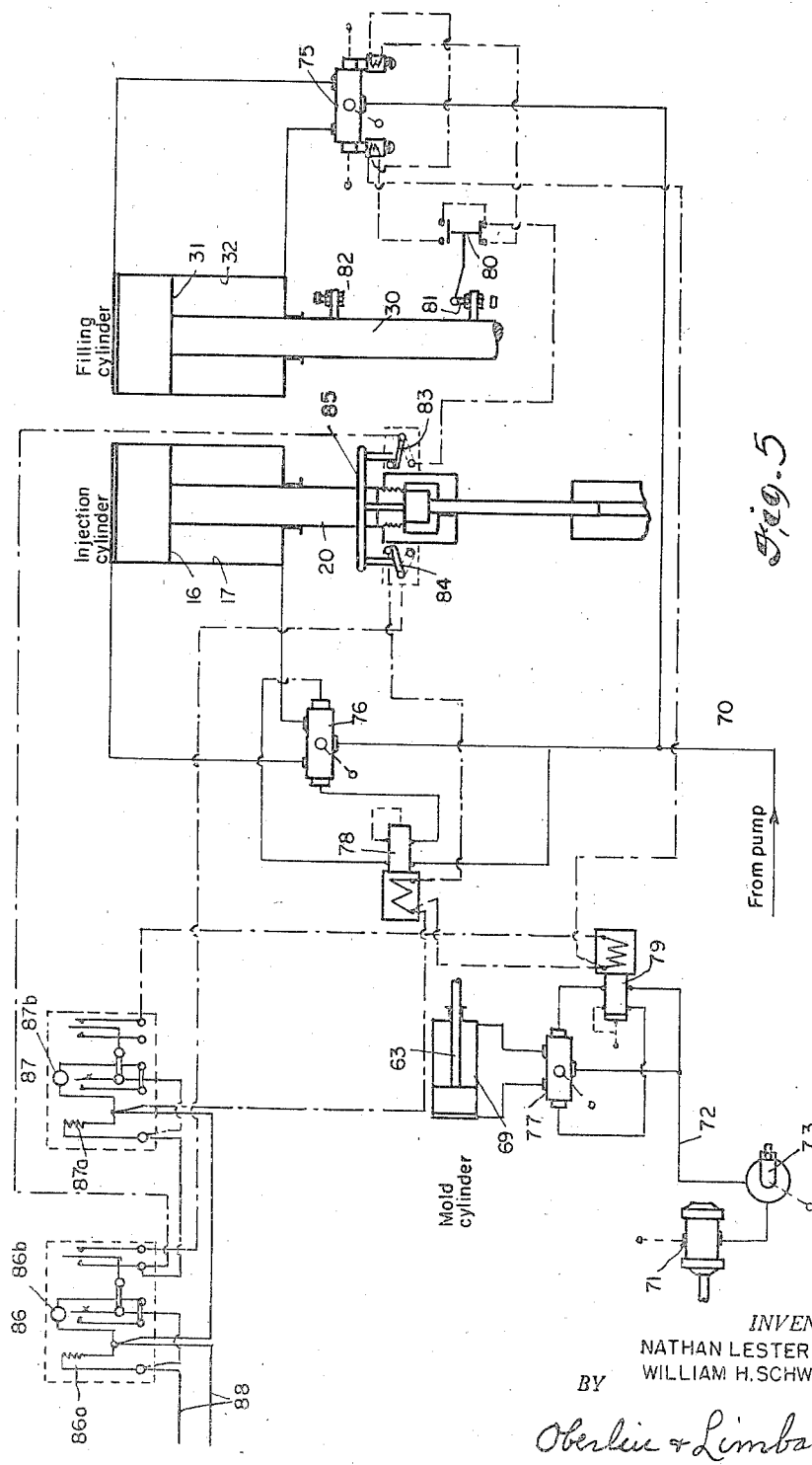

Patented Mar. 29, 1949

2,465,889

UNITED STATES PATENT OFFICE 2,465,889

INJECTION MOLDING APPARATUS

Nathan Lester, Shaker Heights, and William H. Schwartz, Cleveland, Ohio, assignors to Lester Engineering Company, Cleveland, Ohio, a corporation of Ohio Application April 16, 1945, Serial No. 588,432

15 Claims. (Cl. 18—30)

1

The present improvements, relating as indicated to plastic molding apparatus, have more particular regard to that type of plastic molding known as "injection molding," where the plastic material requires first to be subjected to heat and pressure in order to reduce it from solid to a fluid, plasticized state, and is then introduced into a mold cavity under pressure.

One of the objects of the present invention is to permit such plasticization of the material to be molded, under pressure and other conditions independent of those utilized in injection of the same into the mold cavity. To this end such preliminary operation is carried out in a separate chamber from that in which the plasticized material is introduced for the purpose of being injected into the mold cavity.

A further object is to provide for a system of automatic control of the various steps involved, including introduction of the plastic material in its initial solid state, such preliminary plasticization thereof, and subsequent injection into the mold cavity. Still another object is to provide an apparatus which will be simple and compact in construction, capable of withstanding the pressures involved, which in such preliminary step may be relatively high, on the order of 20,000 to 30,000 lbs. per square inch, and having its parts conveniently accessible for purposes of assembly and disassembly.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:

Fig. 5 is a diagrammatic view of the apparatus showing the system of electrical and other controls utilized in the operation thereof.

Figure 2:
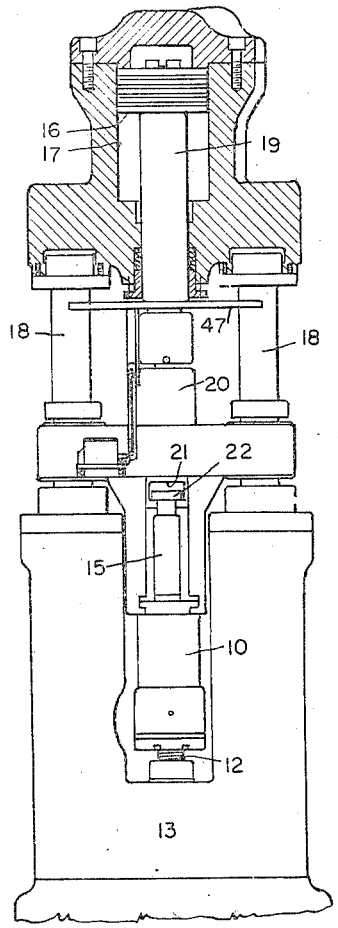
Fig. 2 is a similar side elevation of the same as viewed from the opposite side to that of Fig. 1 and with certain parts shown in section.
Figure 1:
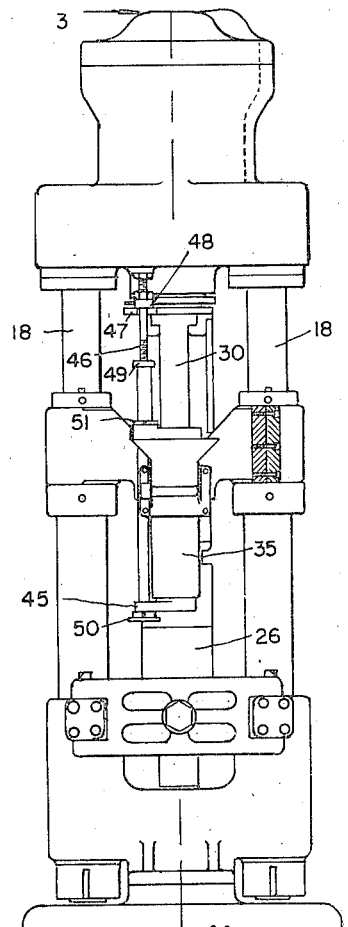
Fig. 1 is a side elevation of an apparatus embodying our present improvements.
Figure 3:
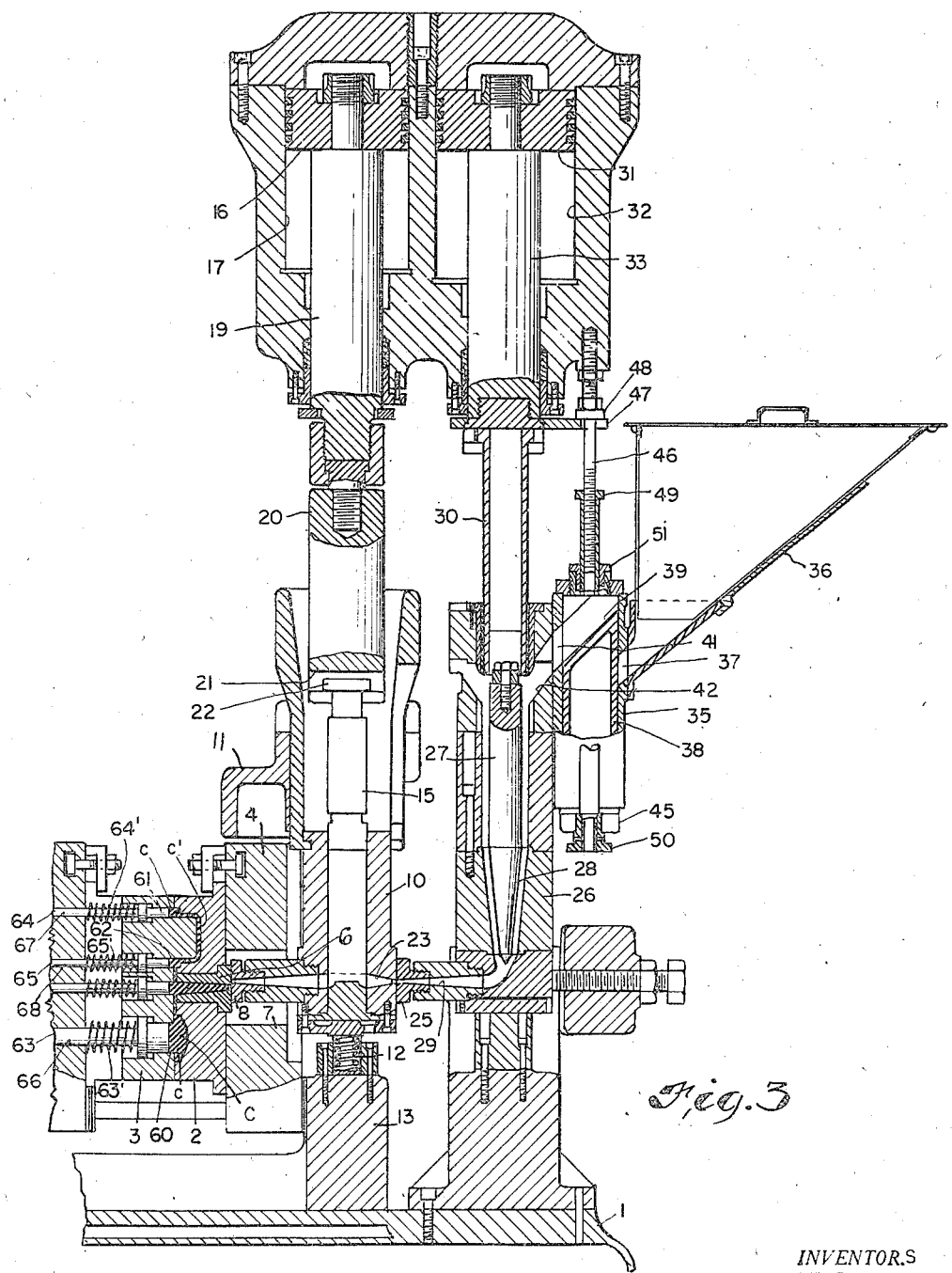
Fig. 3 is a central section of the apparatus taken on the plane indicated by the lines 3—3 on Figs. 1 and 2, respectively.

Referring more particularly to Figs. 1, 2 and 3 of the drawings, the illustrative molding machine there shown will be seen to comprise a common base 1 on which the several mechanisms with which we are here concerned are mounted along with a suitable die operating mechanism, which is not illustrated but which will preferably be of the construction illustrated in Patent No. 2,262,615 issued to one of the present applicants under date of November 11, 1941. However, in Fig. 3 (see also Fig. 4), we do show the parts 2 and 3 of a typical die such as may be operated by the mechanism in question, the first such part being attached to a fixed die plate 4 while the second is mounted so as to be movable toward and from the first and to be held thereagainst under the necessary back pressure by the operating mechanism in question during the molding operation. There is also associated with such second, movable, die member, a pressure chamber 69, the detailed construction and function of which will be presently explained. As illustrated, die member 1 which as described is attached to a fixed plate 4, will desirably be provided on its outer face with a sprue fitting 6 which projects a slight distance into a central opening 7 formed in such plate, such fitting having a smooth face adapted to closely contact with the opposed face of a discharge nozzle 8 carried by the injection mechanism which will now be described.

The main element of such injection mechanism is a cylinder 10 which is mounted in a secondary frame structure 11 for limited movement in a direction parallel with the contact faces of the sprue fitting 6 and discharge nozzle 8, in other words, in a vertical direction in the machine or apparatus as illustrated. Normally said cylinder 10 is maintained in the position illustrated in Fig. 3, in which the opening in discharge nozzle 8 is out of alignment with the opening in the opposed sprue fitting 6, by means of a coil spring 12 interposed between the lower end of said cylinder and a block 13 that rises from main frame 1.

Reciprocably mounted in cylinder 10 is a piston or plunger 15, the lower end of which in the position of the parts just preferred to will be located near the upper end of said cylinder as shown in full lines in Fig. 3, but during the injection step may be moved downwardly approximately to the lower end of the cylinder as shown in dotted outline in said figure. Reciprocation of plunger 15 is produced by means of an actuating piston 16 in a cylinder 17 formed in a supplemental frame structure supported above cylinder 10 by means of posts 18 that rise from the base of the machine, said piston having a piston rod 19 provided with a rigid extension 20 which in turn has a lost motion connection with the upper end of the plunger. As shown, such connection is provided through the medium of a transverse slot 21 in said extension that is adapted to engage a flat head 22 on such upper plunger end, the slot being of somewhat greater depth than the head. Such connection also permits the ready interchange of one plunger 15 for another of different length, when it is desired to change the volume of plastic to be injected from cylinder 10 into the mold.

Plastic material in proper fluid condition is designed to be supplied to cylinder 10 through an inlet opening 23 at the lower end thereof, such opening being preferably located directly opposite the exit opening in nozzle 8. The outer face of the cylinder adjacent opening 23 is in the form of a smooth flat surface with which the opposed face of a discharge nozzle 25 of a filling or plasticizing cylinder 26 located adjacent to cylinder 10.

Assuming the space within the latter to have been filled with plastic material in proper fluid state discharged from said nozzle 25 through opening 23, the initial effect of downward movement of plunger 15 will be to force cylinder 10 downwardly against compression spring 12 a sufficient distance to cut off such supply opening and thereupon bring the opening in discharge nozzle 8 in alignment with the opening in the sprue fitting 6 of the fixed mold member. The continuing downward movement of piston 15 will then discharge the body of plastic material in the cylinder through such last mentioned openings until the mold cavity is filled.

The filling or plasticizing cylinder 26 in the main is of conventional construction. Thus there is supported within said cylinder the usual spreader comprising an upper cylindrical portion 27 and a lower conical portion 28, which is longitudinally grooved to provide spaces for passage of the material in subdivided form to a horizontal discharge opening 29 with which nozzle 25 is connected. Material received in the upper portion of cylinder 26 is forced downwardly around the spreader by a reciprocating hollow plunger 30 that is fitted to the annular space between the upper portion 27 of said spreader and the inner wall of the cylinder. Said plunger is reciprocated by means of a piston 31 separating in a cylinder 32 adjacent previously described cylinder 17, said piston having a rod 33 suitably connected at its lower end with the upper end of plunger 30.

The plastic material is ordinarily in dry granular form and for the purpose of supplying such material to the upper portion of cylinder 26 the following means are provided. Attached to one side of such upper cylinder end is a housing 35 to which in turn is attached a hopper 36 having a downwardly inclined wall that leads to a discharge opening 37 in such housing. Vertically reciprocable within the latter is a gate 38 that is formed at its upper end with an inclined transverse passage 39, the upper end of which in the lower position of the gate will be in register with the discharge opening 37 of hopper 36, while in its upper position, in which the gate closes off such discharge opening, the lower end of said passage 39 will be in register with an opening 41 that leads into the upper flared end 42 of the cylinder 26.

Reciprocation of gate 38 in unison with the reciprocation of plunger 30 is derived by means of a lost motion connection between the two. For this purpose a laterally projecting arm 45 on the lower end of the gate is connected with the lower end of a rod 46 that depends vertically alongside the housing 35, being received at its upper end in a laterally projecting arm 47 on piston rod 33 at the point where the latter is attached to plunger 30. Threadedly or otherwise adjustably mounted on rod 46 are two spaced stops 48 and 49 which lie one above and the other below said arm 47. A nut 50, threaded on the lower end of rod 46, permits adjustment of the position of the gate relative to the rod; while a friction bushing 51, which engages an intermediate portion of the rod, serves to retain the same in whichever position it is left by engagement of arm 47 with the respective stops 48 and 49.

As a result of the foregoing construction, when the piston 30 is in fully raised position, as illustrated in Fig. 3, the gate is likewise raised in position where its lower end communicates with the upper end of the bore in the filling or plasticizing cylinder 26, and any material within said passage will accordingly be discharged into the annular space around the spreader while the plunger 30 is in its raised position. Upon downward movement of piston 31, and correspondingly downward movement of said plunger, the arm 47, after an interval, will engage stop 49 and move gate 38 downwardly into the position where the passage 39 therein registers with the discharge opening 37 of hopper 36. The gate will then remain in this position until the arm 47 on the succeeding upward movement of piston 31 engages stop 48 on rod 46, the interval in question being long enough to permit the passage to be filled with material from the hopper.

Figure 4:
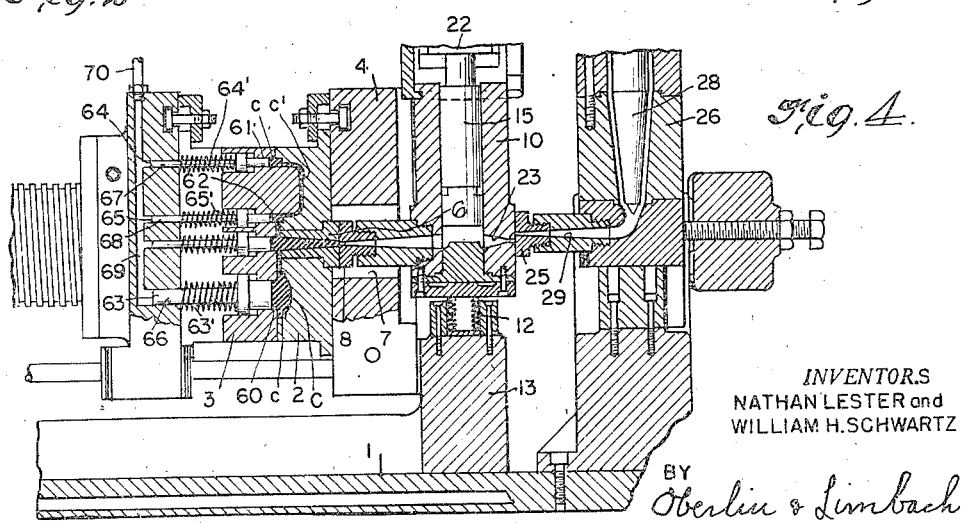
Fig. 4 is a sectional view similar to that of Fig. 3, but showing only the lower parts of the apparatus and with certain of such parts in a different operative position.

As previously indicated, the construction and operation of the die parts associated with the injection cylinder 10 is best shown in Fig. 4. It will be understood of course that the die parts 2 and 3 thus illustrated are merely typical, the die cavity being purposely shown as of irregular shape, designed to form a casting C having a portion c' of relatively thin section and other portions c of relatively large or thick section.

Adjacent those parts of the mold cavity in which such relatively large casting portions are formed, as well as opposite the sprue, the die part 3 is provided with excess material reservoirs 60, 61 and 62, respectively, such reservoirs being of cylindrical cross section and fitted therein are the inner ends of plungers 63, 64 and 65, respectively, the outer ends or stems of which are fitted in cylindrical openings 66, 67 and 68 within the movable platen to which said die part 3 is attached. These last-mentioned openings communicate with a common fluid pressure chamber 69 to which pressure fluid may be supplied through a flexible connection 70. Associated with each of the plungers 63, 64 and 65 is a compression spring 63', 64' and 65' which normally retains the same in position during the period when fluid plastic material is being injected into the mold from cylinder 10. However, at the proper stage in the operation, additional pressure may be applied to the respective plungers by the admission of pressure fluid into chamber 69.

In operating the apparatus with a die part thus provided with supplemental means in the form of one or more such plungers 63, 64 and 65 for applying pressure to the plastic material confined in the mold cavity between the two mold parts 2 and 3, following closing of the latter and during injection of the plastic material, such plungers are held merely under the pressure of the associated springs. However, following the closing of the gate of the mold cavity by relative shifting movement of the cylinder 10, fluid under pressure is supplied to the common chamber 69 whereby the several plungers may be forced toward the casting under pressure in excess of that of said springs. The extra pressure thus applied serves the very important purpose of preventing the formation of so-called vacuum voids at points in the casting incidentally to transformation of the material from plastic to solidified or set state, and as a result the finished casting will be uniformly compact and dense through all sections irrespective of the considerable variation in the latter.

It has been deemed unnecessary to illustrate the manner in which the parts of the apparatus as described above are heated, so as to raise to the proper temperature the plastic material first as received in the filling or plasticizing cylinder 26, then in the injection cylinder 10. It will be understood, however, that suitable electrical resistance or other heating appliances will be incorporated in or associated with said cylinders in the manner usual in casting machines of the type in question. It will also be understood that fluid pressure cylinders 17 and 32, whereby the plungers in said cylinders 10 and 26 respectively are operated, will be provided with suitable ports for the supply and exhaust of pressure fluid thereto. There will also be associated with said cylinders, or rather with the parts respectively operated by the pistons reciprocable therein, suitable control devices whereby the timing of the several operations of the apparatus is regulated and determined so that such operations will automatically follow in proper sequence and at proper intervals. Such control and timing means will be found sufficiently illustrated in the diagrammatic Fig. 5 which will now be described conjointly with a general description of the operation of the apparatus.

In said Fig. 5 only such parts of the operative mechanism described above are shown as are deemed necessary to an understanding of the system of electrical and other controls employed. Thus of the filling or plasticizing mechanism only the actuating piston 31, the cylinder 32 in which it moves and the extension 30 of the piston rod are shown; similarly of the mold injection mechanism only the piston 16, cylinder 17 and piston rod extension 20 are shown, and likewise in connection with pressure chamber 69 only one of the several piston plungers, viz. plunger 63, operated by pressure in said chamber, is shown. As previously explained, on the downward stroke of piston 31 material previously received in the filling or plasticizing cylinder 26 is injected into the adjacent mold injecting cylinder 10; and when said piston 31 retracts, a fresh charge of granular thermoplastic material is gravity fed from the supply hopper 36 through the operation of gate 38 into said filling or plasticizing cylinder.

The several operations just described will continue until the injection cylinder 10 is filled. When this stage is reached piston 16 descends, takes up the lost motion in the connection between piston rod extension 20 and plunger 15 and forces the latter downwardly. The initial effect of such downward movement of plunger 15 is to move cylinder 10 bodily downwardly against compression spring 12 a sufficient distance to shut off the connection of filling cylinder 10 therewith and at the same time bring injection nozzle 8 in alignment with the sprue opening of the mold. After the mold cavity has been filled a proper interval is allowed to elapse to permit the plastic material being molded to partially solidify, whereupon the piston or pistons in the auxiliary pressure chamber 69 are actuated so as to apply additional pressure to such confined plastic material. The time that this auxiliary or supplemental pressure is thus applied will vary depending upon the character of the material and shape of the article being molded.

For operating the several pistons just referred to a liquid medium such as oil will be preferably used, such liquid being supplied under suitable pressure to cylinders 17 and 32 from a pump (not shown) through a branched line 70. However, for a reason that will presently be explained, the liquid for auxiliary pressure chamber 69 is desirably supplied from a separate source as from pump 71 through a line 72 provided with a relief valve 73, as shown in the lower left hand corner of Fig. 5.

Associated with cylinder 32 is a solenoid-operated 4-way valve 75, the spool of which is spring centered. Similarly associated with cylinders 17 and 69 respectively are pilot-operated 4-way valves 76 and 77. The control system also includes two solenoid-operated pilot valves 78 and 79 interconnected as will appear with said valves 76 and 77.

Connected for operation by the rod 30 of piston 31, upon reciprocation of the latter, is a toggle switch 80 which is adapted to be thrown in opposite directions by adjustable stops 81 and 82 on said piston rod. These stops, upon completion of the upward and downward movements respectively of the piston in cylinder 32, trip a roller and lever mechanism, making and breaking contacts in such switch 80 which is of double pole, single throw type.

Connected for operation by the piston rod 20 of piston 16 are limit switches 83 and 84 which are adapted to be operated by the lost play motion between said piston rod and the plunger 15 in mold injection cylinder 10. Such connections include an arm 85 which is adapted upon downward movement to swing switches 83 and 84 from position as shown in full lines connecting corresponding upper contacts to position as shown in dotted lines connecting two lower contacts. The electrical circuit includes two timers 86 and 87, interposed as shown in the leads 88 from the source of current supply to the system.

The cycle of operations will now be described, starting with the mold in locked position, in which the piston in the respective cylinders 17, 32 and 69 will all occupy their raised or retracted positions as shown in Fig. 5; also the head of the plunger that is loosely coupled to the piston rod 20 operating in said cylinder 17 will abut against the upper part of the coupling. It will be understood that a flow of oil or equivalent pressure fluid is supplied through the branched line 70 to the inlet ports of valves 75, 78 and 79, and that similarly a flow of such pressure fluid from auxiliary pump 71 is supplied through line 72 to the inlet ports of valves 77 and 79. At the same time electric current through leads 88 is supplied to timer 86 with the result that clutch coil 86a thereof will be energized to close contacts whereby current is caused to flow to motor 86b, thus beginning the timer's cycle. From the timer, current will then flow to the right hand contact of common contact of switch 85. Current flow will continue through the closed upper contact to the solenoid of pilot valve 78 which upon being energized will cause said valve to shift so as to allow a flow of oil to valve 76 and thereby actuate the latter to admit pressure fluid from line 70 to the head of injection cylinder 17. The piston 16 in the latter will thereupon be forced downwardly, injecting the full charge in the previously filled cylinder 10 into the closed mold cavity. The piston 16 will stay in its lowermost position until the timer contact at the right is broken and contact at the left closed, upon completion of the motor cycle. The breaking of such first contact will deenergize the solenoid in valve 78, whereupon the spool in said valve will reverse its position, allow a flow of oil to the opposite port of valve 76 to that with which connection was previously had, with the result that the fluid pressure supply from line 70 will now be connected with the lower end of cylinder 17 and the piston therein will be raised.

At the same time the closing in timer 86 of the contact at the left permits a flow of current to the terminals of timer 87 as well as to the common contacts of switch 85 with resulting actuation of the filling or plasticizing cylinder, as will now be described.

The flow of current will continue through the common contact of said switch 85 and its now closed lower contact to the closed lower contact of switch 80, through to the right hand solenoid of 4-way valve 75. Upon energization of the solenoid the spool in the valve is shifted to allow pressure fluid supplied from line 70 to flow to the upper end of filling cylinder 32 thereby forcing the piston 31 therein downwardly to inject a charge of plastic material from the filling cylinder into the adjacent injection cylinder. Upon completion of the downward movement of piston 31 adjustable stops 82 will trip switch 80 so as to break the lower contact and close the upper contact thereof. The flow of current will now be allowed to continue through the upper contact at the left hand solenoid of valve 75 and at the same time, due to the breaking of the lower contact of the switch, the right hand solenoid of said valve is deenergized. As a result, the spool of valve 75 will shift so as to direct the flow of pressure fluid to the lower end of cylinder 32 and thereby raise piston 31 to its initial position. On completion of upward movement of the piston, switch 80 will again be tripped, this time by the lower stop 81, whereupon the operation just described will be repeated.

Piston 31 will be reciprocated a sufficient number of times to inject the required amount of plastic material into the mold injection cylinder 10, filling up this cylinder to the point where the material not only contacts with the bottom of the plunger therein, but is effective to raise such plunger to the extent of the lost motion provided by its connection with the lower end of piston 28. Such raising of the plunger will actuate switch 85 so as to break its lower contact and close its upper contacts, with the result that the filling cycle just described will cease.

At the same time the contacts in timer 87 will be shifted to their initial position due to the fact that the clutch coil 86a of timer 86 is energized.

The motor 86b of said timer will now again start on its cycle of operation and a flow of current will also be supplied to the solenoid of valve 79 so as to shift the spool therein and allow a flow of pressure fluid to the inlet port of pilot valve 77 and thence to mold cylinder 69. As a result the plunger 63 in the latter will be urged forwardly so as to exert pressure on the plastic material in the mold cavity which at this stage is sealed off by the closing of its sprue opening with injection cylinder 10. Such pressure is continued until the cycle of timer 87 terminates and the right hand contact therein is open. At this point the flow of current to solenoid 79 ceases and the latter is deenergized, with the result that the flow of oil in valve 77 is reversed and the plunger 63 in mold cylinder 69 will be retracted. Simultaneously, the die will open, the molded article formed therein will be extracted from the mold cavity and the machine will be ready to start another operative cycle.

The reason for providing a separate or auxiliary pump 71 to provide the pressure fluid for mold cylinder 69 is so that when the piston 16 in injection cylinder 17 ascends, the flow of pressure fluid to the head of cylinder 69 will not be interrupted by a division of the flow of fluid. In other words, the movement of the piston 16 is effected entirely independently of that of plunger 63 so that the follow-up of pressure applied by the latter to the material in the mold cavity will instantaneously compensate for the drop in pressure due to reversal of the movement of said piston 16.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In plastic molding apparatus, the combination of a mold having a sprue opening, a filling chamber having a discharge nozzle, a relatively movable injection chamber therebetween having a discharge nozzle and an inlet opening in register and out of register respectively with such sprue opening in said mold and such discharge nozzle in said filling chamber in one position of said injection chamber, and means associated with said injection chamber for moving said injection chamber to a position wherein the discharge nozzle and inlet opening therein is out of and in register with such sprue opening in said mold and such discharge nozzle in said filling chamber respectively.

2. In plastic molding apparatus, the combination of a mold having a sprue opening, a filling chamber having a discharge nozzle, a relatively movable injection chamber therebetween having a discharge nozzle and an inlet opening out of register and in register respectively with such sprue opening in said mold and such discharge nozzle in said filling chamber in one position of said injection chamber, and means associated with said injection chamber for moving said injection chamber to a position wherein the discharge nozzle and inlet opening therein is in register and out of register with such sprue opening in said mold and such discharge nozzle in said filling chamber respectively, such movement of said injection chamber being in response to application of pressure to molding material within said injection chamber.

3. In plastic molding apparatus, the combination of a movable mold injection cylinder having an inlet opening, a filling cylinder adjacent said injection cylinder having a discharge nozzle in register with such opening in one position of said injection cylinder, resilient means supporting said injection cylinder with such opening in such registering position and a plunger reciprocable in said injection cylinder for applying pressure on the material therein, the initial effect of such pressure being to move said cylinder to a position with such opening out of such registering position.

4. In plastic molding apparatus, the combination of a mold injection cylinder, a plunger reciprocable in said cylinder, means having a lost-motion connection with said plunger for reciprocating same, a filling cylinder for supplying material to said injection cylinder and for moving said plunger to take up such lost motion when said injection cylinder is filled with material, a plunger reciprocable in said filling cylinder, means for reciprocating said last-named plunger, and means responsive to the lost motion take up movement of said first-named plunger to control reciprocation of said filling cylinder plunger.

5. In plastic molding apparatus, the combination of a mold injection cylinder, a plunger reciprocable in said cylinder, means having a lost-motion connection with said plunger for reciprocating same, a filling cylinder for supplying material to said injection cylinder and for moving said plunger to take up such lost motion when said injection cylinder is filled with material, a plunger reciprocable in said filling cylinder, means for reciprocating said last-named plunger, and means responsive to the lost motion take up movement of said first-named plunger to interrupt operation of said filling cylinder plunger.

6. In plastic molding apparatus, the combination of a relatively movable mold injection cylinder, a plunger reciprocable in said cylinder, means having a lost-motion connection with said plunger for reciprocating same, a filling cylinder for supplying material to said injection cylinder and for moving said plunger to take up such lost motion when said injection cylinder is filled with material, a plunger reciprocable in said filling cylinder means normally reciprocating said last-named plunger, and means actuated by the taking up of such lost-motion connection of said first-named plunger to interrupt operation of said filling cylinder plunger, and to effect movement of said injection cylinder relative to said filling cylinder.

7. In plastic molding apparatus, the combination of a filling cylinder, a mold injection cylinder movable relative to said filling cylinder between positions opening and closing communication between them, plungers reciprocable in said respective cylinders, said injection cylinder being moved relative to said filling cylinder to close communication between them upon application of pressure to material in said injection cylinder, and means controlling operation of the plunger in said filling cylinder, said means being responsive to filling of said injection cylinder with material to interrupt operation of the plunger in said filling cylinder.

8. In plastic molding apparatus, the combination of a mold, an injection cylinder for supplying material under pressure to said mold, a plunger associated with the latter for supplying supplemental pressure to material therein, means independent of said plunger for closing connection between said injection cylinder and mold and means responsive to such closing for actuating said plunger.

9. In plastic molding apparatus, the combination of a mold, an injection cylinder for supplying material under pressure to said mold, a plunger associated with the latter for supplying supplemental pressure to material therein, a filling cylinder for supplying material to said injection cylinder, and means for closing connection between said injection cylinder and mold and simultaneously connecting said filling cylinder with said injection cylinder and actuating said plunger.

10. In plastic molding apparatus, the combination of a mold, an injection cylinder for supplying material under pressure to said mold, said injection cylinder being movable relative to said mold between positions opening and closing communication between them, a plunger associated with said mold for applying supplemental pressure to material therein, and fluid pressure actuated means connected to independent sources of fluid under pressure respectively operable to move said injection cylinder to a position closing communication between said injection cylinder and mold and simultaneously actuate said plunger.

11. In plastic molding apparatus, the combination of a mold injection cylinder, a filling cylinder normally connected with said injection cylinder, plungers reciprocable in said respective cylinders and means responsive to filling of said injection cylinder to interrupt operation of the plunger in said filling cylinder, said injection cylinder being movably mounted relative to said filling cylinder to close such connection, such movement being effected by application of pressure to material within said injection cylinder by the plunger therein.

12. In plastic molding apparatus, the combination of a mold injection cylinder, a filling cylinder normally connected wtih said injection cylinder, plungers reciprocable in said respective cylinders, means for reciprocating said plungers, a timing device controlling said means and means responsive to filling of said injection cylinder with molding material to interrupt reciprocation of said filling cylinder plunger and to condition said injection cylinder plunger reciprocating means so as to be operable through said timing device.

13. In plastic molding apparatus, the combination of a mold, an injection cylinder for supplying material under pressure to said mold, a plunger associated with the latter for applying supplemental pressure to material therein, means independent of said plunger for closing connection between said injection cylinder and mold and timing devices associated with said injection cylinder and said plunger for simultaneously effecting such closing of the connection between said injection cylinder and mold and actuation of said plunger.

14. In plastic molding apparatus the combination of a mold, an injection cylinder for supplying material under pressure to said mold, a plunger associated with the latter for applying supplemental pressure to material therein, fluid pressure actuated means connected to independent sources of fluid under pressure, spring means associated with said injection cylinder, said fluid pressure actuated means being respectively operable in one direction to maintain connection between said cylinder and mold in opposition to said spring and to maintain said plunger in a withdrawn position and means for simultaneously reversing said fluid pressure actuated means to respectively permit said spring means to close such connection between said injection cylinder and mold and to actuate said plunger.

15. In plastic molding apparatus, the combination of a filling cylinder, an injection cylinder, and a mold, a plunger associated with each of the foregoing for filling said injection cylinder with material, for supplying material under pressure to said mold, and for applying supplemental pressure to material within said mold respectively, means for closing connection between said injection cylinder and said mold and for opening connection between said injection cylinder and said filling cylinder, and timing devices for controlling said means and for simultaneously effecting actuation of the plungers associated with said mold and with said filling cylinder.

NATHAN LESTER.
WILLIAM H. SCHWARTZ.

REFERENCES CITED

The following references are of record in the file of this patent:

UNITED STATES PATENTS

| Number | Name | Date |
|---|---|---|
| 2,111857 | Jeffery | Mar. 22, 1938 |
| 2,181,157 | Smith | Nov. 28, 1939 |
| 2,187,212 | MacMillin | Jan. 16, 1940 |
| 2,193,832 | Morin | Mar. 19, 1940 |
| 2,202,140 | Burroughs | May 28, 1940 |
| 2,274,800 | Lester | Mar. 3, 1942 |
| 2,344,176 | Shaw | Mar. 14, 1944 |
| 2,355,613 | Wacker | Aug. 15, 1944 |
| 2,359,840 | Goessling | Oct. 10, 1944 |

FOREIGN PATENTS

| Number | Country | Date |
|---|---|---|
| 541,787 | Great Britain | Dec. 11, 1941 |